United States Patent [19]

Basseches

[11] 4,159,074
[45] Jun. 26, 1979

[54] DESOLDERING METHOD

[76] Inventor: Mark T. Basseches, 521 Fifth Ave., New York, N.Y. 10017

[21] Appl. No.: 882,813

[22] Filed: Mar. 2, 1978

Related U.S. Application Data

[62] Division of Ser. No. 685,524, May 12, 1976, abandoned.

[51] Int. Cl.$^2$ .............................................. B23K 31/00
[52] U.S. Cl. .................................................... 228/264
[58] Field of Search .......................... 228/1 A, 19, 264

[56] References Cited

U.S. PATENT DOCUMENTS

| | | | |
|---|---|---|---|
| 2,815,430 | 12/1957 | Weiss | 228/1 A X |
| 2,902,577 | 9/1959 | Brown | 228/1 A |
| 4,034,202 | 7/1977 | Vandermark | 228/19 X |

FOREIGN PATENT DOCUMENTS 2223195  1/1973  Fed. Rep. of Germany ........... 228/264

Primary Examiner—C. W. Lanham
Assistant Examiner—Kenneth J. Ramsey
Attorney, Agent, or Firm—Mark T. Basseches; Paula T. Basseches

[57] ABSTRACT

The present invention relates to a desoldering tool or device especially intended for desoldering electrical connections of the type used for supporting components in printed circuit boards. The device includes a heating element for melting the solder connection by contact therewith and a vibrating mechanism which relatively moves the two conductive elements defining the connection during the course of cooling of the melted joint whereby, upon completion of cooling, the component is essentially free of mechanical connection to its former receptacle. The invention further relates to the method of desoldering which involves melting a soldered connection and relatively vibrating the theretofore connected components during cooling of the solder, especially by pressure exerted on one of the connectors by a vibratable heating member.

2 Claims, 3 Drawing Figures

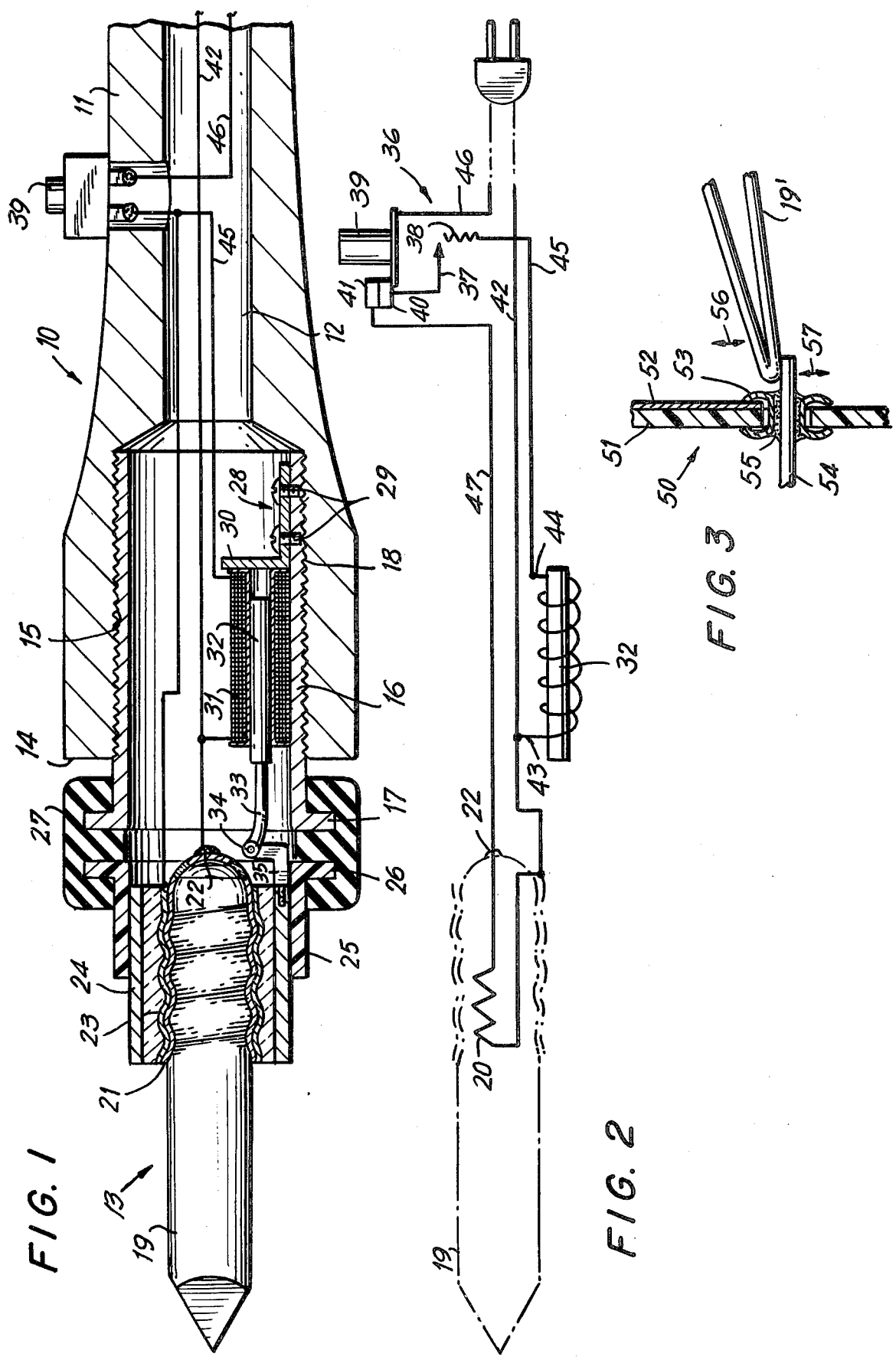

DESOLDERING METHOD

This is a division of application Ser. No. 685,524, filed May 12, 1976 now abandoned.

BACKGROUND OF THE INVENTION

1. Field of the Invention

The present invention is in the field of a tool useful in the electronics industry, and is directed more particularly to a desoldering device.

2. The Prior Art

In the repair of electronic components, such as condensers, resistors, transistors, I.C.s etc., it is frequently necessary to remove a component from the printed circuit board to which it is soldered. Many such components incorporate a multiplicity of connections emanating from a single unit to spaced eyelets in the foil of a printed circuit board. The removal of components having multiple connections without damaging the board is an exceedingly time consuming and delicate task.

It will be readily recognized that where a single lead is soldered through an eyelet in a printed circuit board, it may be possible simply to melt the solder in the eyelet, grasp the lead, and pull the lead clear while the solder is still molten. However, where a multiplicity of connectors emanate from a single component, it is virtually impossible simultaneously to melt the solder in all of the eyelets to permit lateral removal of all connectors at once.

In accordance with one current desoldering technique, the connections to individual leads are heated one at a time while the leads are pulled. This method involves gross distortion of the leads and damage to the component, and often to the board, since the lead cannot be removed in a direction normal to the board due to the continued presence of other still attached leads. In accordance with another desoldering method, a miniature torch is used simultaneously to heat all connections to a component. Obviously, use of a torch involves severe risk of overheating and damage to the printed circuit board.

Alternate methods employed for desoldering include the so-called "solder suckers" wherein heat resistant plastic materials having low coefficients of conduction are brought into close adjacency with the molten solder to be removed and a vacuum created to suck off increments of the molten solder. Devices of this sort have largely proven ineffective since even if only minor increments of the solder remain, a strong mechanical connection is still afforded.

Other methods for desoldering employ a so-called "solder wick" which is brought into contact with the soldered joint so that increments of the molten solder are drawn off into the wick. Such method involves considerable expense and wastage since the wick or braid is expensive and the method suffers from the same drawback inhering in the solder sucker method, namely, minor remaining solder increments leave a strong mechanical bond. Additionally, use of a solder wick requires that the soldered connection be subjected to a substantially greater amount of heat than is necessary merely to melt the solder, due to the cooling effect on the solder connection of the wick.

SUMMARY

The present invention may be summarized as directed to an improved desoldering device and method which involves heating a solder joint, and particularly an attachment eyelet of a printed circuit board, to a temperature at which the solder is molten, and thereafter, with the heat tool still in contact with the joint, vibrating the connection sought to be removed while the solder is cooling, whereby a space is defined about the junction of the connector and solder, and whereby the remaining solder surrounding the connector is of a crystalline nature or texture.

With the device described, the individual connections emanating from a single component may be desoldered without physically removing the connector from the eyelet until all such connectors have been treated in the manner described, whereupon the component may be easily lifted away from the board.

The device and method of the present invention therefore does not necessarily require removal of the solder, in contrast to methods heretofore known, but merely results in a breakage in the mechanical connection between the eyelet and the conductors emanating from the component.

It is accordingly an object of the present invention to provide an improved desoldering tool and method.

A further object of the invention is the provision of a desoldering tool which includes means for melting the soldered connection and means for relatively and continuously moving the theretofore soldered components during cooling of the solder, thereby assuring a lack of significant mechanical bond between the components and permitting ready separation thereof.

A further object of the invention is the provision of a device of the type described which includes heating means, such as a soldering iron of the resistance or of the transformer loop type, means for interrupting the heat generated by the heating means, and means for vibrating the heating means during and/or after interruption of the heating effects.

A further object of the invention is the provision of a desoldering tool of the type described, incorporating a handle having control means, such as a switch or switches, and a flexible connection interposed between the handle and the heating means.

Still a further object of the invention is the provision of a method of releasing the mechanical bond between two conductors theretofore connected by solder by heating the solder joint and relatively vibrating the parts during cooling.

To attain these objects and such further objects as may appear herein or be hereinafter pointed out, reference is made to the accompanying drawings, forming a part hereof, in which:

FIG. 1 is a fragmentary sectional view through a desoldering apparatus in accordance with the invention;

FIG. 2 is a schematic circuit diagram thereof;

FIG. 3 is a fragmentary view of the tip of a desoldering device in accordance with an embodiment of the invention in the environment of a connection to be desoldered.

Referring now to the drawings, there is shown in FIG. 1 a desoldering tool which consists essentially of a conventional soldering iron and means for inducing a vibratory or oscillatory movement of the tip thereof. The desoldering device 10 includes a handle 11 and a hollow central bore 12 through which are made the various electrical connections to the soldering head 13.

The handle portion 11, adjacent its outer end 14, may be internally threaded as at 15, for the reception in such internal threading of a sleeve member 16 having a terminal annular shoulder 17. It will be understood that the sleeve 16 includes an external thread portion 18 to be received in the threads 15 of the handle.

The soldering head assembly has a conventional replaceable soldering tip assembly 19, including an internal heating element 20 (FIG. 2), the leads to which are connected to the conductive shell 21 and center contact 22, respectively. The soldering tip is preferably of the light duty type, e.g. 25 to 75 watts, and is of low mass so as to cool rapidly when current flow is interrupted.

The shell 21 is threaded, as at 23, for the reception within the usual socket 24 fixed to an inwardly directed sleeve 25. The inwardly directed sleeve 25 terminates in an annular outwardly extending shoulder 26. The sleeve 25 may be formed of metal, but preferably is comprised of a heat resistant plastic material. The shoulders 17 and 26 of the sleeves 16 and 25 are positioned in opposed relationship and received within a surrounding annular elastomeric collar 27. The sleeves may be insert-molded into the collar.

From the foregoing description it will be apparent that, by virtue of the resilience or elasticity of the collar 27 which is interposed between sleeves 16 and 25, the tip assembly 13 is afforded a significant range of relative movement with respect to the handle.

The handle assembly 10 includes a mounting bracket 28 secured to the sleeve 16 as by machine screws 29. The bracket 28 includes a radially extending mounting arm 30, to which is secured the coil component 31 of a vibrator element. An armature 32 is movably guided within the coil 31. A driver arm 33 extends from the armature 32 to a pivot pin 34 carried on an offset bracket 35 fixed to the socket 24.

It will be appreciated that when an alternating current is passed through the coil 31, the armature 32 is caused to move axially within the coil, inducing a movement in the driver arm 33, which movement is transmitted to the socket assembly through the connection of the pin 34 and bracket 35.

The vibrator arrangement described and illustrated will impart an essentially compound movement to the tip 19 of the soldering iron when the same is energized by reason of the offset of the pin 34 from the axis of the armature. The tip will move forwardly and rearwardly, as well as from side to side.

The particular direction of movement, mechanism employed to impart movement, and means for movably suspending the tip are not critical, and it will be readily recognized that other means may be employed to produce the desired oscillations or vibrations of the tip. Additionally, the compound movement described is not mandated, a side to side or in and out movement of the tip being satisfactory, it being merely necessary to adjust the placement of the tip against the work to obtain the most effective loosening action.

It has been determined that the degree of vibration optimally should be in the nature of about several thousandths of an inch or more, although the precise movement is not critical. It is often desirable to vary the amount of oscillatory movement imparted in the course of desoldering in accordance with the clearances provided by the particular connection to be treated.

In the embodiment illustrated in FIGS. 1 and 2, the amount of vibratory movement may be varied by utilizing a variable resistance switch 36. The switch includes a moving contact 37 engaging against resistor member 38, the degree of depression of plunger 39 progressively reducing the amount of resistance interposed between the mains supply and the coil 32, and accordingly progressively increasing the amount of vibratory movement which will be produced.

In the illustrated embodiment, a second contact 40 movable with plunger 39 moves away from fixed contact 41 when the plunger is depressed.

As shown in FIG. 2, the mains supply includes a ground lead 42 connected to one terminal 43 of the coil 32, the opposite terminal 44 of the coil being connected through lead 45 to the variable resistor 38.

The live lead 46 from the mains is connected to movable switch contact 40 which, in the nondepressed position of the plunger, connects to contact 41 leading through conduit 47 to the other terminal 22 of the heater element 20.

From the described diagram it will be evident that when the device is connected to the mains with the plunger in outwardmost position, it will act in the manner of a normal soldering iron, e.g. the current will flow through the closed switch and conduits 47, 42 to the heater element 20. When it is desired to desolder, the tip 19 is engaged against the joint and particularly is pressed against the lead extending from the element to be desoldered until the solder holding the lead is in a molten state. The plunger 39 is then depressed, opening the switch contacts 40, 41, disconnecting the heater element of the soldering tip and bringing the moving contact 37 into engagement with the resistance element 38, completing the circuit through the coil 32. The amount of vibratory movement will depend upon the degree to which the plunger is depressed.

The vibrating tip is continued to be pressed against the lead to be desoldered during cooling of the solder. The cooled solder immediately surrounding the lead evidences a crumbly, crystalline texture and substantial clearances exist between the lead and surrounding cooled solder. With experience, the operator quickly learns to orient the tip in such way that the vibrations achieve maximum effectiveness.

Referring now to FIG. 3, there is disclosed the tip of a desoldering device utilizing a transformer type heater element 19'. Such devices, often referred to as soldering guns, employ a conductive element as a component of the secondary of a step down transformer.

The tip 19' is shown in juxtaposition to a fragmentary section of a printed circuit board 50, the board, as is conventional, including a dielectric backing 51, a foil layer 52 and a soldering eyelet 53. The lead 54 from a component attached to the board is shown passing through the eyelet with a mass of solder 55 mechanically and electrically securing the lead 54 to the eyelet.

In FIG. 3, the tip 19' is pressed against the lead 54 or the eyelet adjacent the lead until the solder mass has melted, whereupon, through an appropriate switching control or controls on the soldering device, the circuit through the transformer primary is interrupted and the circuit in the vibratory assembly activated, whereby the tip 19' is caused to move, e.g. in the direction of the arrow 56. Such movement will cause a concomitant movement of the lead 54, as denoted by the arrow 57, during the cooling stages of the solder mass 55.

After cooling, the soldering tip 19' may be removed and the lead 54 will be loose within the eyelet. In practice, the use of a soldering gun type of heater is preferred to the resistance type by reason of the rapid cooling characteristics of the tip of the gun.

The desoldering effect or the mechanical releasing of the lead from the eyelet is considered to be the result of a plurality of factors, among which are the mechanical movement of the lead during cooling of the solder which, in effect, creates a space or void surrounding and adjacent the lead, the crystalline nature of the solder material as a result of its being moved while cooling, and the natural tendency of cooling solder, when induced to cool rapidly, as by engagement with a heat sink formed by the unheated tip, to assume a more or less crystalline structure. In this context, the tip 19', after interruption of flow of current, cools rapidly, providing the noted heat sink effect.

It will be appreciated in the light of the foregoing disclosure that numerous variations may be made without departing from the spirit of the invention. For instance, the circuitry disclosed in FIG. 2 is illustrated by way of example only, and it may be desirable, especially in the case of soldering gun type units, to provide separate vibration and heating controls whereby initial vibratory movements may be applied before the application of heat is interrupted.

It may likewise be feasible for the means for imparting vibratory movement to the lead to be treated to be separate from the heating element, although the composite construction is considered preferable.

Accordingly, the invention is to be broadly construed within the scope of the appended claims.

Having thus described the invention and illustrated its use, what I claim as new and desire to secure by Letters Patent is:

1. The method of releasing a soldered connection between a lead and a contact to which said lead has been soldered, said lead being disposed substantially normal to the plane of said contact, which comprises the steps of contacting said lead with a heated rigid member thereby to melt said soldered connection, causing said member to cool while in contact with said lead while simultaneously vibrating said member in a direction generally parallel to the plane of said contact until said solder has resolidified, and thereafter removing said lead from said contact in a direction substantially normal to the plane of said contact.

2. The method of releasing a soldered connection between an electronic component having a plurality of leads, said leads being connected to a plurality of contacts disposed substantially normal to said leads, which comprises the steps of subjecting each of said leads successively to the heating, and cooling while vibrating steps as defined in claim 1, and thereafter removing said leads simultaneously from said contacts by shifting said component in a direction substantially normal to the plane of said contacts.

* * * * *